(12) United States Patent
Manrao et al.

(10) Patent No.: US 7,121,389 B2
(45) Date of Patent: Oct. 17, 2006

(54) OIL SYSTEM

(75) Inventors: Ram Kumar Manrao, Chandigarh (IN); Jatinder Singh Chawla, Chandigarh (IN)

(73) Assignee: Punjab Tractors Limited, Punjab (IN)

( * ) Notice: Subject to any disclaimer, the term of this patent is extended or adjusted under 35 U.S.C. 154(b) by 337 days.

(21) Appl. No.: 10/448,070

(22) Filed: May 30, 2003

(65) Prior Publication Data

US 2003/0221921 A1 Dec. 4, 2003

Related U.S. Application Data

(60) Provisional application No. 60/383,786, filed on May 30, 2002.

(51) Int. Cl.
*F16D 56/02* (2006.01)

(52) U.S. Cl. .............................. 188/264 E; 188/264 B; 188/71.6

(58) Field of Classification Search ............. 188/264 R, 188/264 B–264 F, 71.6, 292
See application file for complete search history.

(56) References Cited

U.S. PATENT DOCUMENTS

| | | | | |
|---|---|---|---|---|
| 3,859,790 A | * | 1/1975 | Bacquie et al. | 60/422 |
| 3,945,208 A | * | 3/1976 | O'Connor | 60/420 |
| 4,174,615 A | * | 11/1979 | Kuhn | 60/453 |
| 4,777,797 A | * | 10/1988 | Mucheyer | 60/329 |
| 5,669,479 A | * | 9/1997 | Matsufuji | 192/87.15 |
| 5,975,257 A | * | 11/1999 | Roach | 188/264 F |
| 6,260,668 B1 | * | 7/2001 | McClanahan | 188/71.5 |

* cited by examiner

*Primary Examiner*—Robert A. Siconolfi
(74) *Attorney, Agent, or Firm*—Venable LLP; Catherine M. Voorhees

(57) ABSTRACT

The invention relates to an improved system for supplying filtered oil to wet brakes of the tractor without additional/auxiliary pump. The system comprises of a suitably sized connection provided on the drain line of the Hydraulic system, which supplies required quantity of filtered oil to the wet brakes through a passage with a line pressure of 2–3 kg/cm2. This positively ensures the oil supply and circulation of oil for heat removal from wet brakes. A hollow bush is so sized and located on the brake housing so as to maintain the required level of oil in the brake housing and to drain the excess oil in the transmission housing.

8 Claims, 2 Drawing Sheets

OIL SYSTEM

This application claims the benefit of U.S. Provisional Application Ser. No. 60/383,786, filed May 30, 2002.

BACKGROUND OF THE INVENTION

1. Field of the Invention

This invention relates to an improved oil system for supply of oil to wet brakes of a tractor without the requirement of an additional auxiliary oil pump.

2. Background of the Related Art

It is generally known that oil supply systems for wet brakes utilize assemblies that employ either an auxiliary oil pump to supply a forced quantity of oil for functioning of wet brakes, where oil is received from a transmission housing and returns back to the source, or the wet brakes are an integral part of transmission housing and receive required quantity of oil from the same housing on account of its location. However, the design of an integral construction complicates the serviceability of the wet brakes in the instance of problems. Further, the oil received by the wet brake is not filtered and contain small impurities and particles that lessen the life of the brake due to wear and impregnation.

OBJECTS OF THE INVENTION

An object of the present invention is to propose an improved oil supply system for supply of oil to wet brakes of a tractor and without the requirement of an auxiliary oil pump.

Another object of this invention is to propose an improved oil supply system for supplying oil to wet brakes and obviates the disadvantages of the known art as described hereinabove.

Still another object of this invention is to propose an improved oil supply system for supply of filtered oil to wet brakes.

SUMMARY OF THE INVENTION

In accordance with this invention an improved oil supply system has been provided on the drain line of the hydraulic system which supplies the oil to wet brakes of the tractor. A connection has been provided on the drain line of the hydraulic system which supplies oil to the wet brakes through a passage with a line pressure of average 2–3 kg/cm$^2$. Thus this oil supply system positively ensures the oil supply to wet brakes. A hollow bush is so sized and located on the brake housing so as to maintain the required level of oil in the brake housing and to drain the excess oil in the transmission housing. Since the drain line of the hydraulic system already receives the filtered oil, the oil system ensures the supply of filtered oil to wet brakes. Thus the advantage of required amount of filtered oil supply to wet brake as well as ensuing no additional requirement of auxiliary pump are achieved through this invention.

BRIEF DESCRIPTION OF THE DRAWINGS

The invention will be described with reference to the accompanying drawings and wherein.

DETAILED DESCRIPTION OF THE INVENTION

Figure 1:
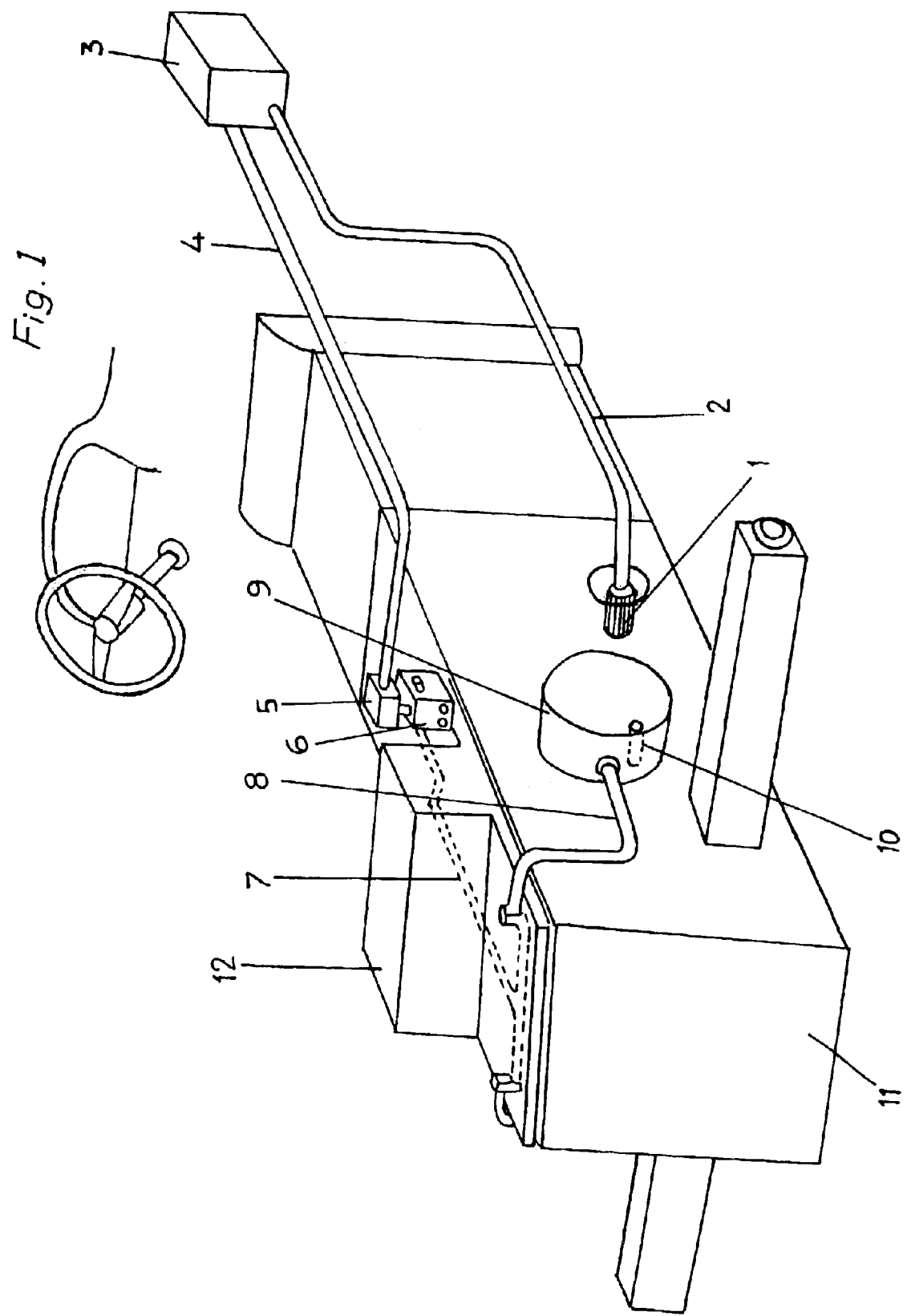
FIG. 1. Shows an isometric view of the oil supply system for wet brake of tractor.

FIG. 1 shows the oil supply system to wet twin brakes located on either side of the tractor. There is a oil filter (1) located inside the transmission housing (11) which acts as an oil tank or reservoir and is connected to pump (3) through suction line (2). Pump (3) supplies oil through delivery line (4) to response body (5), which is further connected to control body (6).

A brake housing (9) is connected to control body (6) (which is housed in rear cover (12)) through oil tapping line (7) and oil supply, line 8. There is an oil passage from brake housing (9) to transmission housing (11) through hollow bush (10). In a preferred embodiment, oil tapping line (7) is incorporated in the hydraulic system for brake housing (9) of the wet brake. In another embodiment, the oil tapping line may supply oil to brake housing (9) at a pressure of between 2–3 kg/cm$^2$. The size of the oil tapping line is designed so that the required amount of oil is delivered to the wet brakes. The oil tapping line and/or the oil supply line may be made of either metal or braided flexible pipe.

Figure 2:
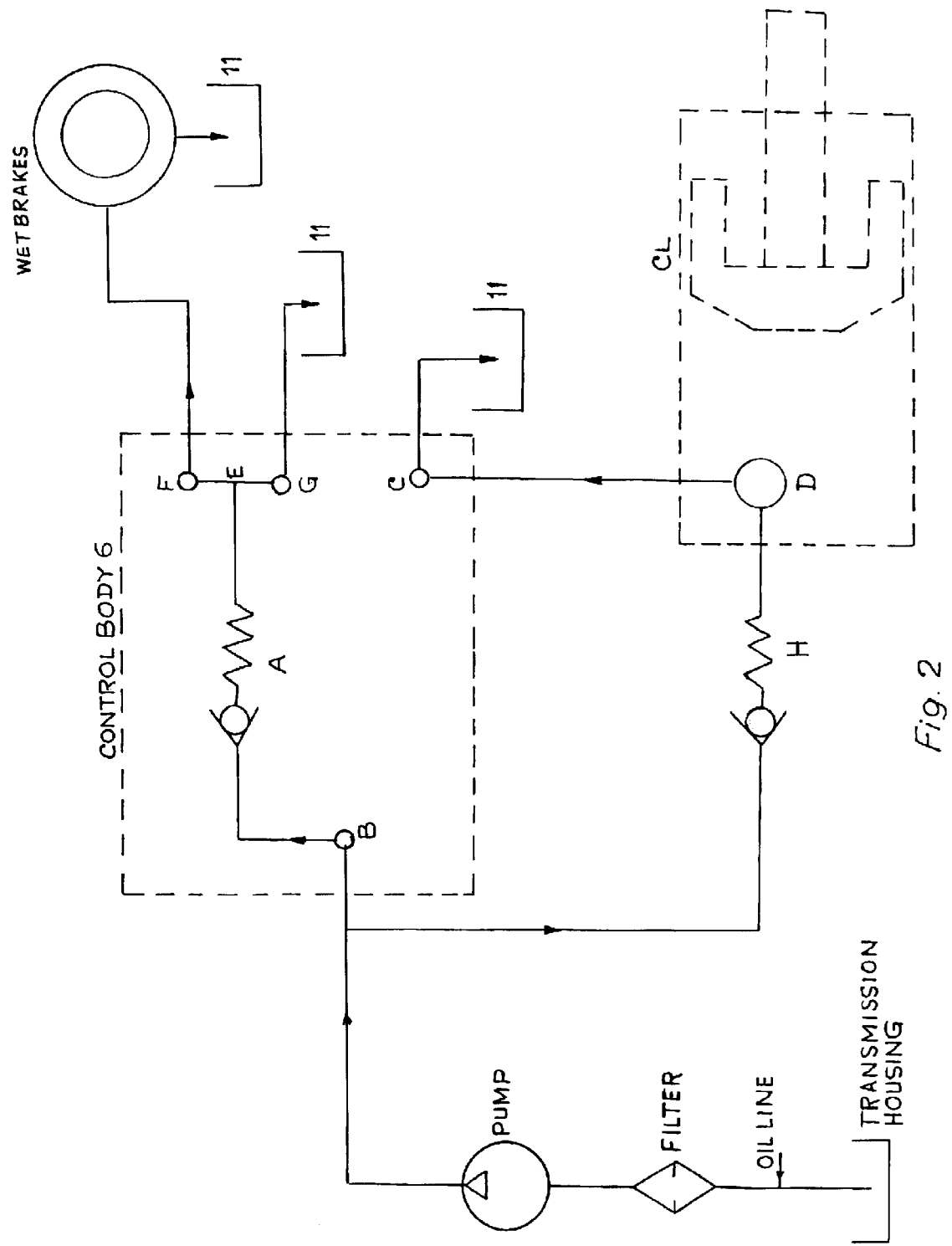
FIG. 2. Shows a schematic hydraulic circuit of a oil supply system for wet brake of a tractor.

Referring to FIGS. 1 and 2, filtered oil is sucked by the pump (3) from transmission housing through filter (1) and the pressurized oil is then supplied to control body (6). Hydraulic control body (6) can be in three conditions: neutral, raising and lowering. At the neutral condition of control body, port B is open and the oil flows through check valve A and reaches the point (E) as shown in FIG. 2. Depending upon the requirement, the drain oil point (E) is partially tapped and is oil is supplied to the wet brakes through hole (F). Balance oil or the remaining oil is drained to transmission housing (11) through drain hole (G). That is, control body (6) includes an oil passage with a first hole (F) and a second hole (G). The size of the first and second holes being designed so that the required amount of oil is delivered to the wet brakes and remaining oil drains to the transmission house, respectively. During the raising conditions of a hydraulic lift, the port (B) and port (C) are closed and oil from the pump goes to hydraulic cylinder (CL) through check valve (H) and port (D), which is turn actuates the hydraulic lift.

This condition remains for 1–2 seconds. Immediately after this, the control body comes to the neutral condition, in a lowering condition of the hydraulic lift, port (C) opens and oil from hydraulic cylinder (CL) flows through port (C) to transmission housing (11). At this time port (B) is also in the open condition and the oil from pump goes to wet brakes as described in neutral condition earlier. Referring to FIG. 1, a hollow bush (10) is provided as connector between transmission housing (11) and the brake housing (9) and the position is to designed that the required minimum level of oil is always maintained in the brake. The excess oil drains back to transmission housing through this bush.

As a result of the above structure, a system for supplying filtered oil to wet brakes of a tractor is achieved that does not require an additional or auxiliary pump. According to one embodiment of the invention, the system includes a suitably sized connection provided on the drain line of the hydraulic system to supply the required quantity of filtered oil to the wet brakes through a passage with a line pressure of 2–3 kg/cm$^2$. This positively ensures the oil supply and circulation of oil for heat removal from the wet brakes.

We claim:

1. An improved oil supply system for wet brakes, comprising:

an oil filter located near a transmission housing of a tractor;

a suction line extending from the oil filter;

a pump for receiving filtered oil from the suction line;

a delivery line coupled to the pump and for delivering filtered oil from the pump;

a control body for receiving filtered oil from the delivery line;

an oil tapping line coupled to the control body for supplying filtered oil to a brake housing for a wet brake and permitting excess oil to drain to the transmission housing; and a hollow bush defining an oil passage between the brake housing and the transmission housing where a required amount of filtered oil is supplied to the wet brake without the use of any auxiliary pump and oil supplied to the brake housing has been tapped from a drain of a hydraulic system of the tractor.

2. The oil supply system of claim 1, wherein said oil tapping line is incorporated in a hydraulic system for the wet brake.

3. The oil supply system of claim 2, wherein said oil tapping line supplies oil to the brake housing at a pressure of between approximately 2–3 kg/cm$^2$.

4. The oil supply system of claim 2, wherein the oil tapping line is of a size that the required amount of oil is delivered to the wet brakes.

5. The oil supply system of claim 1, wherein the oil tapping line is made of either metal or braided flexible pipe.

6. The oil supply system of claim 1, wherein the control body includes an oil passage with a first hole and a second hole.

7. The oil supply system of claim 6, wherein the first hole and the second hole of control body are sized so that the required amount of oil is delivered to the wet brakes and remaining oil drains to the transmission housing respectively.

8. The oil supply system of claim 1, wherein the hollow bush is of a sufficient size and located at a position between the brake housing and the transmission housing in order to maintain the required level of oil in the brake housing and to drain excess oil to the transmission housing.

* * * * *